United States Patent
Au et al.

(10) Patent No.: US 6,489,805 B1
(45) Date of Patent: *Dec. 3, 2002

(54) CIRCUITS, ARCHITECTURES, AND METHODS FOR GENERATING A PERIODIC SIGNAL IN A MEMORY

(75) Inventors: Johnie Au, Cupertino, CA (US); Pidugu L. Narayana, Sunnyvale, CA (US); Sangeeta Thakur, Sunnyvale, CA (US)

(73) Assignee: Cypress Semiconductor Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/441,649

(22) Filed: Nov. 17, 1999

Related U.S. Application Data

(60) Provisional application No. 60/111,559, filed on Dec. 9, 1998.

(51) Int. Cl.$^7$ .................................................. H03K 3/00
(52) U.S. Cl. ........................... 326/46; 327/293; 327/294
(58) Field of Search .................................. 327/291, 293, 327/294, 171, 297; 326/46; 710/57

(56) References Cited

U.S. PATENT DOCUMENTS

| | | | | | |
|---|---|---|---|---|---|
| 4,985,640 | A | * | 1/1991 | Grochowski et al. | 327/258 |
| 5,257,294 | A | * | 10/1993 | Pinto et al. | 375/120 |
| 5,438,300 | A | * | 8/1995 | Saban et al. | 331/16 |
| 5,627,797 | A | | 5/1997 | Hawkins et al. | 365/221 |
| 5,712,992 | A | | 1/1998 | Hawkins et al. | 395/877 |
| 5,790,479 | A | | 8/1998 | Conn | 368/118 |
| 5,809,339 | A | | 9/1998 | Hawkins et al. | 395/877 |
| 5,850,568 | A | | 12/1998 | Hawkins et al. | 395/877 |
| 5,852,748 | A | | 12/1998 | Hawkins et al. | 395/874 |
| 5,920,511 | A | * | 7/1999 | Lee et al. | 365/189.05 |
| 6,114,262 | A | * | 11/2000 | Kingsley | 331/57 |
| 6,184,813 | B1 | * | 2/2001 | Abughazaleh et al. | 341/144 |

* cited by examiner

*Primary Examiner*—Tuan T. Lam
(74) *Attorney, Agent, or Firm*—Christopher P. Maioriana, P.C.

(57) ABSTRACT

A circuit comprising a clock generator and a state machine. The clock generator may be configured to generate an output clock signal in response to (i) a first enable signal and (ii) a second enable signal. The state machine may be configured to generate the second enable signal in response to a first and a second control signal.

22 Claims, 6 Drawing Sheets

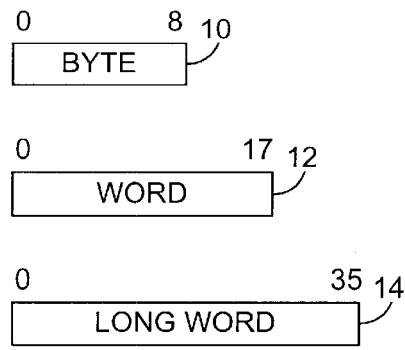
FIG. 1a
(CONVENTIONAL)

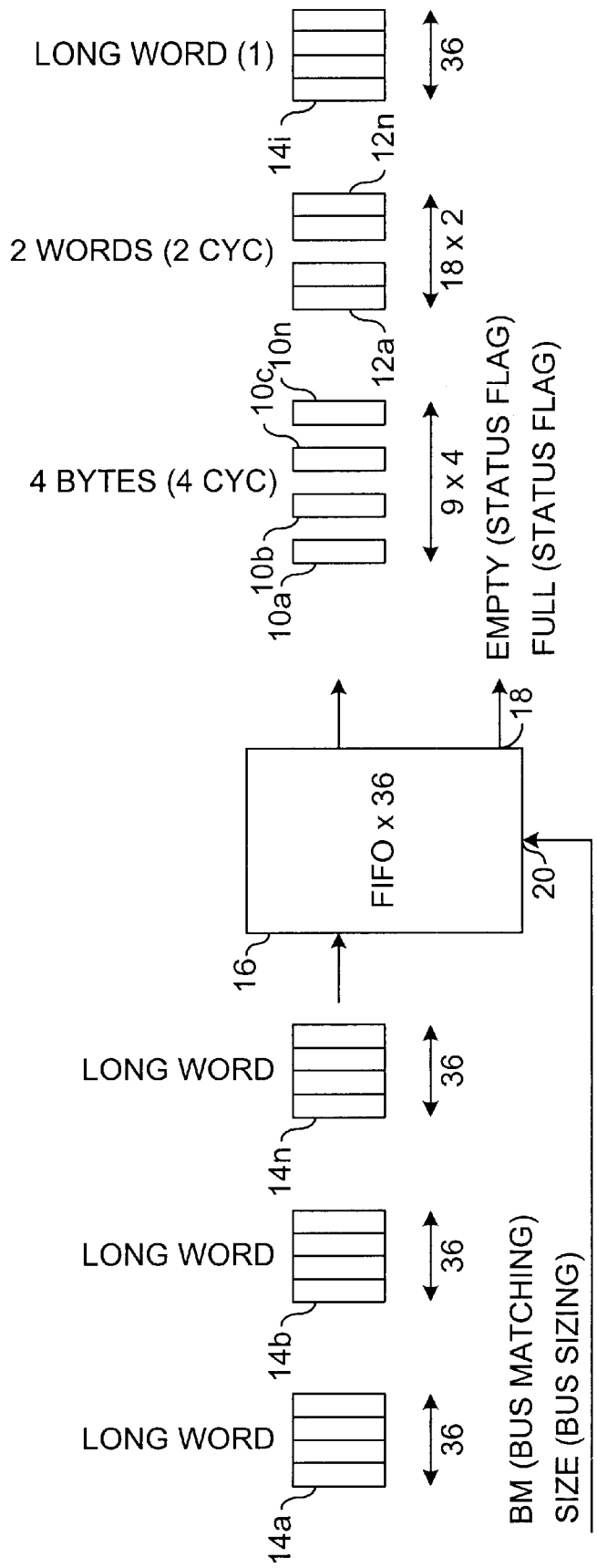
FIG. 1b (CONVENTIONAL)

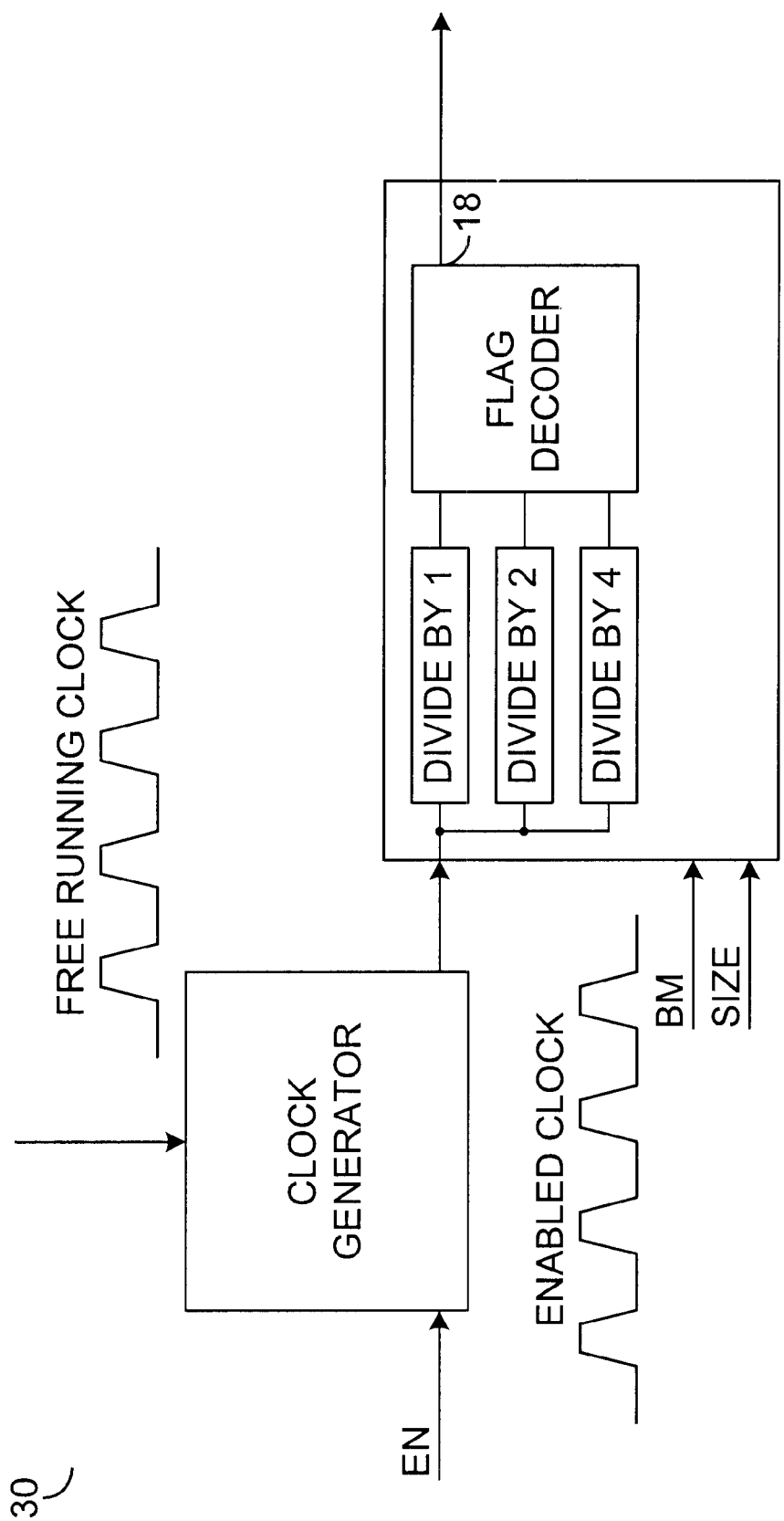
FIG. 2
(CONVENTIONAL)

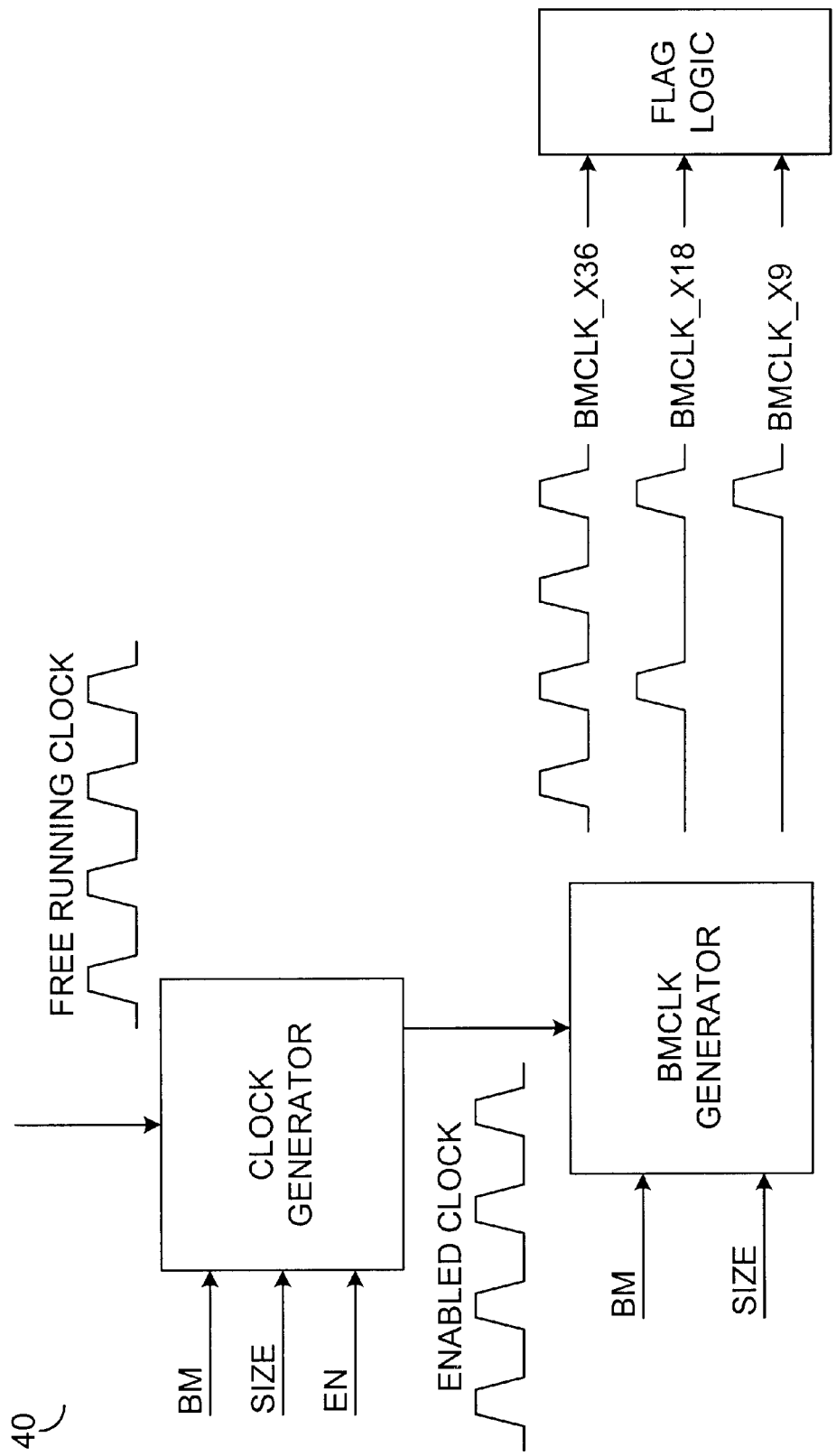
FIG. 3
(CONVENTIONAL)

US 6,489,805 B1

CIRCUITS, ARCHITECTURES, AND METHODS FOR GENERATING A PERIODIC SIGNAL IN A MEMORY

This application claims the benefit of U.S. Provisional Application No. 60/111,559, filed Dec. 9, 1998, which is hereby incorporated by reference in its entirety.

FIELD OF THE INVENTION

The present invention relates to memories generally and, more particularly, to circuits, architectures, and methods for generating a periodic signal in a memory.

BACKGROUND OF THE INVENTION

First-In First-Out (FIFO) memories are used to provide a temporary buffer or storage between two communication devices running asynchronously. In FIFOs with bus matching capabilities, data can be written to and read from the FIFO in different data sizes and frequencies, depending on a particular bus mode of operation. For example, a 36-bit wide data word can be delivered in the form of a byte (i.e., x9), a word (i.e., x18) or a long word (x36) bus mode. Referring to FIG. 1a, a byte 10, a word 12 and a long word 14 are shown. The byte 10 is shown having bits from 0 to 8. The word 12 is shown having bits from 0 to 17. The long word 14 is shown having bits from 0 to 35.

Referring to FIG. 1b, a FIFO 16 is shown receiving a number of long words 14a–14n and presenting a number of bytes 10a–10n, a number of words 12a–12n and a long word 14i. The number of bytes 10a–10n, the number of words 12a–12n and the long word 14i are shown grouped so that a x36 FIFO is implemented. The FIFO 16 has an output 18 that presents status flags indicating the various parameters (i.e., fullness or emptiness) of the FIFO 16. The FIFO 16 also has an input 20 that receives a control signal BM and a second control signal SIZE that control the bus matching and bus sizing, respectively.

FIFOs often have write flag counters and read flag counters to keep track of the number of long words written to (i.e., loaded) and read from (i.e., unloaded) the FIFO. The flag counter must therefore be synchronized with the particular bus mode. In particular, the flag counter should only be incremented when an entire 36-bit operation is finished loading or unloading. The flag counter should increment (i) every cycle if the data packet is in long word form, (ii) every 2 cycles if the data packet is in word form and (iii) every 4 cycles if the data packet is in byte form.

One conventional approach to implementing the flag counter incrementer would be to use a divide-by-2 and a divide-by-4 flag counter, depending on the particular bus mode. However, such an implementation would have the disadvantage of having a slow operation time and/or consume a large amount of chip area. FIG. 2 shows a circuit 30 illustrating such an approach.

Another conventional approach to implementing the flag counter incrementer would be to use a state machine to re-generate a flag bus-matching clock. However, such an implementation would have the disadvantage of having a slow operation time. FIG. 3 shows a circuit 40 illustrating such an approach.

SUMMARY OF THE INVENTION

The present invention concerns a circuit comprising a clock generator and a state machine. The clock generator may be configured to generate an output clock signal in response to (i) a first enable signal and (ii) a second enable signal. The state machine may be configured to generate the second enable signal in response to a first and a second control signal.

The objects, features and advantages of the present invention include providing a flag counter incrementer that may adapt to a particular bus mode that may (i) have a fast operation time; (ii) consume a minimum amount of chip area; (iii) allow dynamic bus-matching re-configuration during operation without requiring a master reset of the FIFO; and/or (iv) transceive a data stream in the form of byte (e.g., 9 bit), word (e.g., 18 bit) or long word (e.g., 36 bit).

BRIEF DESCRIPTION OF THE DRAWINGS

These and other objects, features and advantages of the present invention will be apparent from the following detailed description and the appended claims and drawings in which:

FIG. 1a illustrates various sized words that may be is written/read to/from a memory;

FIG. 1b illustrates a FIFO memory reading and writing various sized words;

FIG. 2 illustrates a conventional approach for generating a flag counter incrementer;

FIG. 3 illustrates another conventional approach for generating a flag counter incrementer;

DETAILED DESCRIPTION OF THE PREFERRED EMBODIMENTS

Figure 4:
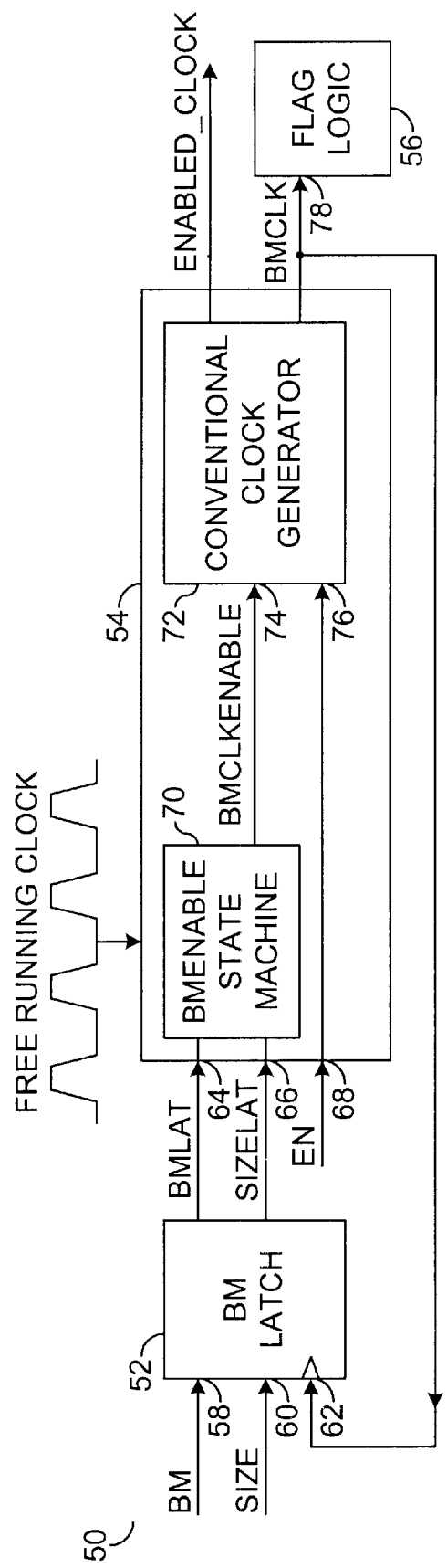
FIG. 4 illustrates a preferred embodiment of the present invention.

Referring to FIG. 4, a circuit 50 is shown in accordance with a preferred embodiment of the present invention. The circuit 50 may comprise a latch block (or circuit) 52, a clock generator block (or circuit) 54 and a flag logic block (or circuit) 56. The latch block 52 may have an input 58 that may receive a control signal (e.g., BM). The control signal PM may control the bus matching of a FIFO (not shown). The latch 52 may have an input 60 that may receive a control signal (e.g., SIZE). The control signal SIZE may control the bus sizing of the FIFO. The latch 52 may also have an input 62 that may receive a clock signal (e.g., BMCLK) from the clock generation block 54.

The latch block 52 may present a latched bus matching control signal (e.g., BMLAT) and a latched bus sizing control signal (e.g., SIZELAT). The clock generation block 54 may have an input 64 and an input 66 that may receive the signal BMLAT and the signal SIZELAT. The clock generation block 54 may have an input 68 that may receive an enable signal (e.g., EN). The clock generation block 54 may have an input that may receive an external free running clock signal. The clock generation block 54 generally comprises a state machine 70 and a clock generation portion 72. The state machine 70 may present a clock enable signal (e.g., BMCLKENABLE) to an input 74 of the clock generation portion 72. The clock generation portion 72 may also have an input 76 that may receive the enable signal EN. The clock generation portion 72 may present an enable clock signal (e.g., ENABLED_CLOCK) and the clock signal BMCLK. The clock signal BMCLK may be implemented as a bus matching clock signal. However, the clock signal BMCLK may be implemented as any type signal in order to meet the criteria of a particular implementation. The signal ENABLED_CLK and/or the signal BMCLK may be presented in response to the signal BMCLKENABLE and the signal EN. The bus matching clock signal may BMCLK be presented to an input 78 of the flag logic 56.

Figure 5A:
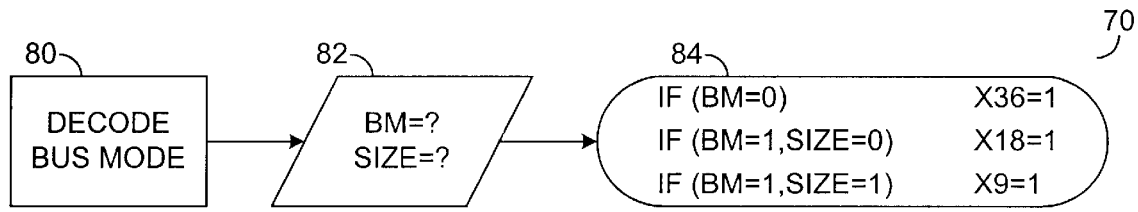
FIG. 5a illustrates a state machine in accordance with a preferred embodiment of the present invention.

Referring to FIG. 5a, a block diagram of a portion of the state machine 70 that determines a number of parameters (e.g., X36, X18, and X9) used to generate the enable signal BMCLKENABLE is shown. The state machine 70 may have a state 80, a state 82 and a state 84. The state 80 may decode a bus mode of operation of the FIFO. The state 82 may determine the state of the control signal BM and the state of the control signal SIZE. The state 84 may determine the parameters X36, X18 and X9. In one example, if the signal BM equals 0, then the FIFO is in long word mode and the parameter X36 may be asserted. If the signal BM equals 1 and the signal SIZE equals 0, then the FIFO is in word mode and the parameter X18 may be asserted. If the signal BM equals 1 and the signal SIZE equals 1, then the FIFO is in byte mode and the parameter X9 may be asserted.

The following TABLE 1 illustrates an example of the configuration of the parameters X36, X18 and X9 in response to the signal BM and the signal SIZE, which generally configure the bus mode of the incoming and outgoing data stream:

TABLE 1

| Bus Mode | BM | SIZE | Data Packet Size | # of clocks to transmit/receive a long word | bm logic |
| --- | --- | --- | --- | --- | --- |
| x 36 | 0 | X | 36 bits | 1 | pass through all enabled clocks; update the flag pointer every cycle |
| x 18 | 1 | 0 | 18 bits | 2 | block the 1$^{st}$ clock, and only update the flag pointer at the last word cycle of the long word transmission |
| x 9 | 1 | 1 | 9 bits | 4 | block the 1$^{st}$ and 3rd clocks, and only update the flag pointer at the last byte cycle of the long word transmission |

Figure 5B:
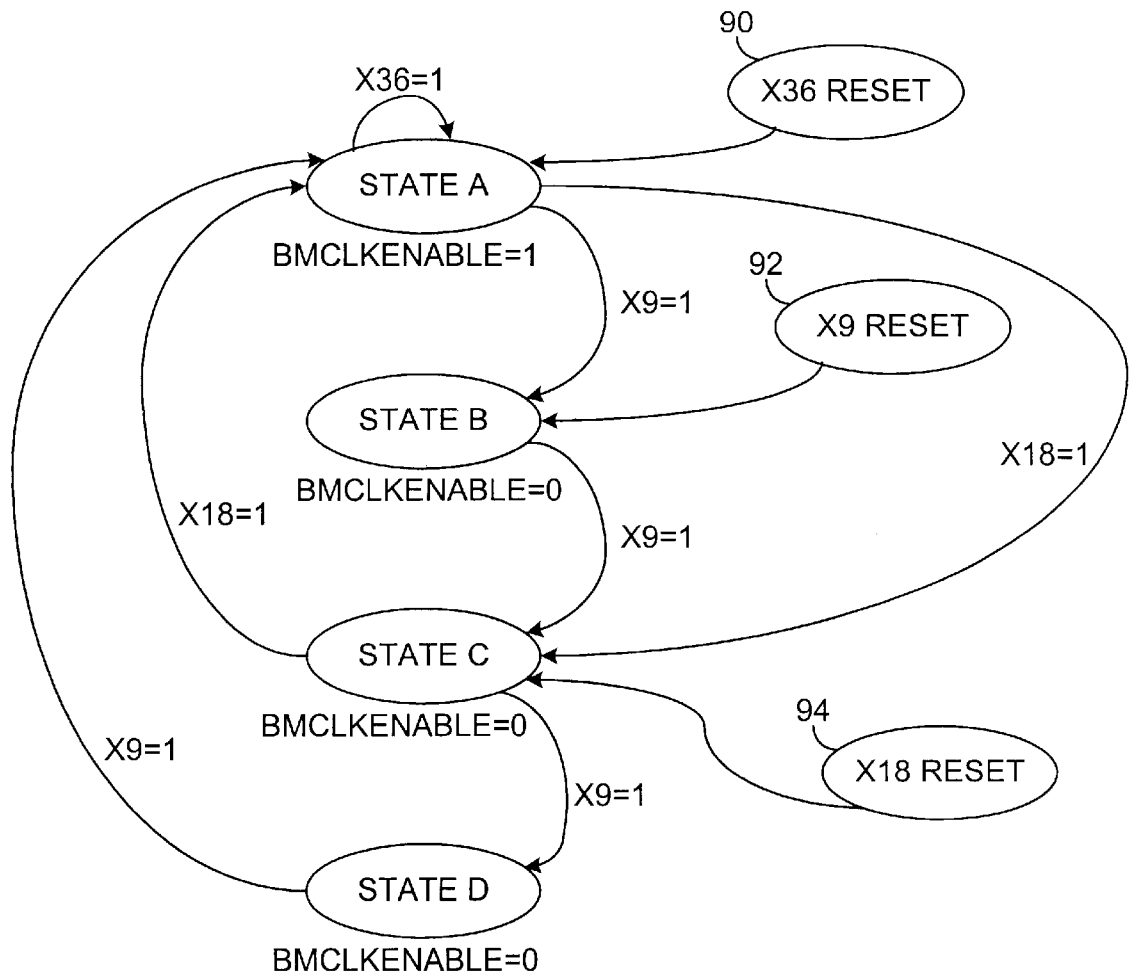
FIG. 5b illustrates a more detailed diagram of the state machine of the present invention.

Referring to FIG. 5b, a portion of the state machine 70 that may determine the state of the enable signal BMCLKENABLE is shown. Beginning in a state A, if the parameter X36 is equal to a 1, then the state machine generally remains in the state A, where the signal BMCLKENABLE is equal to a 1. If the parameter X9 is a 1, then the logic generally enters a state B, where the signal BMCLKENABLE is equal to a 0. If the parameter X9 continues to be a 1, the logic generally enters a state C, where the signal BMCLKENABLE is equal to a 1. If the parameter X9 continues to be a 1, the logic generally enters to a state D, where the signal BMCLKENABLE is equal to a 1. If the parameter X9 continues to be a 1, the logic generally enters the state A, where the signal BMCLKENABLE is equal to a 1.

When in the state A, if the parameter X18 is equal to a 1, the logic generally enters the state C. When in the state C, if the parameter X1 continues to be a 1, the logic generally enters the state A. The state 90 generally represents a reset for the long word mode, the state 92 generally represents a reset for the byte mode and the state 92 generally represents a reset for the word mode. In general, the output clock is only enabled when the logic is in the state A.

The present invention may be implemented in a system that comprises two independent synchronous FIFOs allowing data to flow from a Port A to a Port B (and vice versa) at different frequencies. The FIFOs may act as buffers between two communication systems such as routers or switches. In one example, the FIFOs may have a maximum of a 16K long word (i.e., 36 bits). The data in a typical networking system may be transmitted not just in the long word form (36 bits), but also in the form of word (18 bits) and/or byte (9 bits) at a given time. If the data stream is in word mode, two clock cycles are generally required to transmit the complete long word. If the data stream is in byte mode, 4 cycles are generally required to transmit the complete long word.

The present invention may dynamically configure the FIFO to transceive data streams of various sizes. The FIFOs status flag logic must generally synchronize with the bus configuration dynamically to keep track of the number of long words transmitted and/or received by the FIFO. The synchronized flag logic generally accommodates the EMPTY, FULL, ALMOST EMPTY and ALMOST FULL status flags in a single-chip solution.

The flag logic block 56 may implement a modification of a high-speed flag architecture (with the addition of bus matching logic) to synchronize the clocks for the flag logic. Such a high-speed flag architecture may be found in U.S. Pat. Nos. 5,712,992; 5,809,339; 5,627,797; 5,850,568 and 5,852,748, each of which is hereby incorporated by reference in their entirety. The flag logic mainly comprises a write pointer and a read pointer, an empty and full state machine and two adders for almost empty status and almost full status flags as well as some miscellaneous logic. The write pointer may keep track of the number of completed long words written into the FIFO and the read pointer may keep track of the number of completed long words read from the FIFO. In general, all the status flags are decoded from the read and write pointers.

To implement the flag synchronization, a byte-matching state machine may keep track of the completion of a long word sequence according to the bus mode configuration. In general, the flag pointer is only updated upon the completion of a long word transmission (or the equivalent pieces of a long word).

Figure 6:
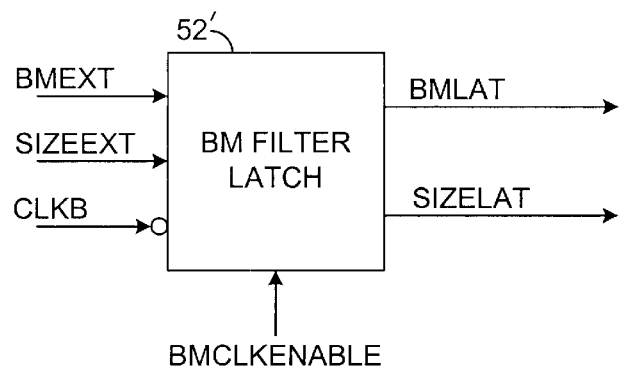
FIG. 6 is a block diagram of a blocking filter of the present invention.

The present invention may allow bus-matching/switching during operation. However, the bus mode configuration should generally be changed during an update cycle. Otherwise, the long word sequence may be corrupted. To avoid an illegal change of the bus mode at the wrong cycle, changes in the signal BM and the signal SIZE may be blocked except during the update cycle. FIG. 6 illustrates an example of such a blocking filter (e.g., a circuit 52'). The blocking filter 52' may be implemented similarly to the circuit 52.

For a X36 device, the signal BMCLKENABLE is generally HIGH all the time. For a X18 device, the signal BMCLKENABLE is generally HIGH every other enabled clock. For a X9 device, the signal BMCLKENABLE is generally HIGH every fourth cycle. The signal BMCLKENABLE generally serves as a filter and to generate the signal BMCLK which then may feed into the flag logic block 56.

The present invention may use the bus-matching state machine 70 to control the generation of the flag updation clocks without major re-work of an existing flag logic. The signal BMCLKENABLE may block any illegal bus mode configuration signal changes at the inner long-word cycles. The present invention may simplify the design development and verification of the flag logic for different bus matching modes. Since the flag's clocks are generated by the state machine 70, existing flag logic generally works for all various bus-matching modes.

The present invention provides a methodology to synchronize the FIFO status flag counters with respect to various data packet sizes selected by the bus matching mode of operation. A state machine within the clock generator of the FIFO may create an internal bus-matching enable signal which may be used to generate the bus-matching clock BMCLK for the status flag logic.

The latch block 52 may latch the external signals BM and SIZE upon a master reset operation to prevent switching of the signals BM and SIZE during normal operation, (i.e., the signals BM and SIZE must generally remain stable throughout the whole operation).

The present invention may provide the option to use the bus-matching clock BMCLK to latch the signals BM and SIZE to provide dynamic bus-matching capability so that the status flag logic 56 may be synchronized with the various data packet size during operation, without corrupting the long word sequence (e.g., it may prevent the switching of the internal signals BM and SIZE without the completion of the long word transmission).

The state machine 70 may be implemented as a write clock generator as well as a read clock generator of the FIFO. The present invention may be modified to apply to even larger data packet sizes with minor modification of the state machine 70 for synchronization of the flag logic 56.

While the invention has been particularly shown and described with reference to the preferred embodiments thereof, it will be understood by those skilled in the art that various changes in form and details may be made without departing from the spirit and scope of the invention.

What is claimed is:

1. A circuit comprising
   a clock generator circuit configured to generate an output clock signal in response to a first enable signal and a second enable signal;
   a state machine configured to generate said first enable signal in response to a first and a second control signal; and
   a latch circuit configured to generate said first and second control signals in response to a first and a second externally generated control signal.

2. The circuit according to claim 1, wherein said latch circuit is configured to generate said first and second control signals in further response to said output clock signal.

3. The circuit according to claim 1, wherein said output clock signal is presented to a flag logic circuit.

4. The circuit according to claim 1, wherein said first enable signal comprises a bus-matching enable signal.

5. The circuit according to claim 1, wherein said first enable signal is generated in further response to an external clock signal.

6. The circuit according to claim 1, wherein said output clock signal comprises a bus-matching clock signal.

7. The circuit according to claim 3, wherein said flag logic circuit generates a number of status flags in response to said output clock signal.

8. The circuit according to claim 1, wherein said state machine is further configured to generate said first enable signal as a read clock signal when in a first mode and a write clock signal when in a second mode.

9. The circuit according to claim 1, further comprising said latch circuit configured to filter said first and second control signals in response to said first enable signal.

10. The apparatus according to claim 1, wherein said clock generator circuit presents said output clock signal to a First-In First-Out (FIFO) memory.

11. A circuit comprising:
    means for generating an output clock signal in response to a first enable signal and a second enable signal;
    means for generating said first enable signal in response to a first and a second control signal; and
    means for generating said first and second control signals in response to a first and a second externally generated control signal.

12. A method for generating an output clock signal comprising the steps of;
    (A) generating said output clock signal in response to a first enable signal and a second enable signal;
    (B) generating said first enable signal in response to a first and a second control signal; and
    (C) generating said first and second control signals in response to a first and a second externally generated control signal.

13. The method according to claim 12, further comprising the step of:
    generating said first and second control signals in further response to said output clock signal.

14. The method according to claim 12, wherein said first enable signal comprises a bus-matching enable signal.

15. The method according to claim 12, wherein said step (B) further comprises generating said first enable signal in response to an external clock signal.

16. The method according to claim 12, wherein said output clock signal comprises a bus-matching clock signal.

17. The method according to claim 12, further comprising the step of:
    generating a number of status flags in response to said output clock signal.

18. The method according to claim 12, wherein said step (B) comprises generating said first enable signal as a read clock signal in a first mode and a write clock signal in a second mode.

19. The method according to claim 13, further comprising the step of:
    filtering said first and second externally generated control signals in response to said first enable signal.

20. The circuit according to claim 1, wherein said clock generator circuit is further configured to generate an enabled clock signal.

21. The method according to claim 12, wherein step (A) further comprises generating an enabled clock signal.

22. The method according to claim 12, wherein said output clock signal comprises a First-In First-Out (FIFO) clock signal.

* * * * *